US011674559B2

(12) United States Patent
Cazares et al.

(10) Patent No.: US 11,674,559 B2
(45) Date of Patent: *Jun. 13, 2023

(54) DRIVE ASSEMBLY INCLUDING RAW HUB EXTENSION

(71) Applicant: Schaeffler Technologies AG & Co. KG, Herzogenaurach (DE)

(72) Inventors: Ing. Juan Pablo Cazares, Puebla (MX); Angel Josue Lopez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1255 days.

This patent is subject to a terminal disclaimer.

(21) Appl. No.: 16/101,510

(22) Filed: Aug. 12, 2018

(65) Prior Publication Data

US 2020/0049226 A1 Feb. 13, 2020

(51) Int. Cl.
*F16F 15/123* (2006.01)
*F16F 15/315* (2006.01)

(52) U.S. Cl.
CPC ........ *F16F 15/1232* (2013.01); *F16F 15/315* (2013.01); *F16F 2226/00* (2013.01); *F16F 2232/02* (2013.01); *F16F 2238/026* (2013.01)

(58) Field of Classification Search
CPC .. F16F 15/1232; F16F 15/315; F16F 15/1295; F16F 15/1297; F16F 2226/00; F16F 2232/02; F16F 2238/026; F16F 2236/08
See application file for complete search history.

(56) References Cited

U.S. PATENT DOCUMENTS

| 2,953,674 | A  | * | 9/1960  | Grodt   | B21J 9/08     |
|           |    |   |         |         | 219/152       |
| 5,979,209 | A  | * | 11/1999 | Belliato| B21J 5/08     |
|           |    |   |         |         | 72/340        |
| 8,512,153 | B2 | * | 8/2013  | Degler  | F16F 15/1232  |
|           |    |   |         |         | 464/64.1      |
| 9,739,339 | B2 | * | 8/2017  | Roses   | F16F 15/12313 |
| 11,333,217| B2 | * | 5/2022  | Cazares | F16F 15/12313 |
| 2005/0109570 | A1 | * | 5/2005 | Muller | F16F 9/3242   |
|           |    |   |         |         | 188/321.11    |

FOREIGN PATENT DOCUMENTS

DE 112015001985 T5 * 1/2017 .......... F16F 15/1217

* cited by examiner

*Primary Examiner* — Xuan Lan Nguyen
(74) *Attorney, Agent, or Firm* — Davidson, Davidson & Kappel, LLC

(57) ABSTRACT

A drive assembly for a vehicle drive train includes a base assembly including a base hub configured for non-rotatably connecting to an outer circumferential surface of a transmission input shaft. The base assembly includes a torsional damper fixed to the base hub. The torsional damper includes an input section and an output section drivingly connected by springs. The springs allow relative rotation between the input section and the output section. The output section of the torsional damper is non-rotatably fixed to the base hub. The drive assembly also includes a raw hub extension configured for non-rotatably connecting to an engine crankshaft. The raw hub extension is non-rotatably fixed to the input part of the torsional damper at an engine side of the torsional damper. The torsional damper allows relative rotation between the raw hub extension and the base hub.

19 Claims, 5 Drawing Sheets

DRIVE ASSEMBLY INCLUDING RAW HUB EXTENSION

The present disclosure relates generally to drive assemblies and more specifically to drive assemblies for connecting an engine crankshaft to a transmission in marine applications.

BACKGROUND

Conventionally, boat drive trains may include a damper assembly between the internal combustion engine and the transmission.

SUMMARY OF THE INVENTION

A drive assembly for a vehicle drive train includes a base assembly including a base hub configured for non-rotatably connecting to an outer circumferential surface of a transmission input shaft. The base assembly includes a torsional damper fixed to the base hub. The torsional damper includes an input section and an output section drivingly connected by springs. The springs allow relative rotation between the input section and the output section. The output section of the torsional damper is non-rotatably fixed to the base hub. The drive assembly also includes a hub extension configured for non-rotatably connecting to an engine crankshaft. The hub extension is non-rotatably fixed to the input part of the torsional damper at an engine side of the torsional damper. The torsional damper allows relative rotation between the hub extension and the base hub.

In accordance with embodiments of the drive assembly, the hub extension may be a single piece including a hub section configured for non-rotatably connecting to an outer circumferential surface of the engine crankshaft. The hub extension may include a flange section including a radially inner section joining an outer circumferential surface of the hub section. The flange section may be non-rotatably fixed to the input section of the torsional damper. The flange section may be non-rotatably fixed to the input section of the torsional damper by fasteners passing through a radially outer section of the flange section. The flange section may include an intermediate section radially between the radially inner section and the radially outer section. The intermediate section may extend axially toward the torsional damper from the radially inner section to the radially outer section. The input part may include an engine side cover plate and a transmission side cover plate each including windows for receiving the springs. The engine side cover plate may include a radially outer section outside of the windows thereof. The fasteners may pass through the radially outer section of the engine side cover plate. An inner diameter of the hub section may be greater than an inner diameter of the base hub.

A method of constructing a drive assembly for a vehicle drive train includes constructing a base assembly including a base hub configured for non-rotatably connecting to an outer circumferential surface of a transmission input shaft. The base assembly includes a torsional damper fixed to the base hub. The torsional damper includes an input section and an output section drivingly connected by springs. The springs allow relative rotation between the input section and the output section. The output section of the torsional damper is non-rotatably fixed to the base hub. The method also includes non-rotatably fixing a hub extension to the input part of the torsional damper at an engine side of the torsional damper. The hub extension is configured for non-rotatably connecting to an engine crankshaft. The torsional damper allows relative rotation between the hub extension and the base hub.

In accordance with embodiments of the drive assembly, the method may further include forging a raw hub extension as a single piece including a flange section and a hub section, a radially inner section of the flange section joining an outer circumferential surface of the hub section. The method may further include, after the forging of the raw hub extension as the single piece, forming the hub extension by machining an inner circumferential surface of the hub section into a configuration for non-rotatably connecting to an outer circumferential surface of the engine crankshaft. The non-rotatably fixing of the hub extension to the input part of the torsional damper may include non-rotatably fixing the flange section to the input section of the torsional damper. The flange section may be non-rotatably fixed to the input section of the torsional damper by fasteners passing through a radially outer section of the flange section. The flange section may include an intermediate section radially between the radially inner section and the radially outer section. The intermediate section may extend axially toward the torsional damper to connect the radially inner section to the radially outer section. The input part, may include an engine side cover plate and a transmission side cover plate each including windows for receiving the springs. The engine side cover plate may include a radially outer section outside of the windows thereof. The fasteners may pass through the radially outer section of the engine side cover plate. An inner diameter of the hub section may be greater than an inner diameter of the base hub.

A method of manufacturing drive assemblies for vehicle drive trains is also provided that includes manufacturing a plurality of raw hub extensions of a same size and shape; machining a first subset of the raw hub extensions in a first manner to create first hub extensions for non-rotatably connecting to first crankshafts of a first size and a first shape; and machining a second subset of the raw hub extensions in a second manner, which is different from the first manner, to create second hub extensions for non-rotatably connecting to second crankshafts of a second size and a second shape. At least one of the first size and the first shape is different from the second size and the second shape. The method also includes connecting each the first hub extensions to one of a plurality of first base assemblies. Each of the first base assemblies includes a first base hub configured for non-rotatably connecting to an outer circumferential surface of a first transmission input shaft. Each of the first base assemblies includes a first torsional damper fixed to the first base hub. The first torsional damper includes a first input section and a first output section drivingly connected by first springs. The first springs allow relative rotation between the first input section and the first output section. The first output section of the first torsional damper is non-rotatably fixed to the first base hub. The method also includes connecting each the second hub extensions to one of a plurality of second base assemblies. Each of the second base assemblies includes a second base hub configured for non-rotatably connecting to an outer circumferential surface of a second transmission input shaft. Each of the second base assemblies includes a second torsional damper fixed to the second base hub. The second torsional damper includes a second input section and a second output section drivingly connected by second springs. The second springs allow relative rotation between the second input section and the second output section. The second output section of the second torsional damper is non-rotatably fixed to the second base hub.

BRIEF DESCRIPTION OF THE DRAWINGS

The present invention is described below by reference to the following drawings, in which.

DETAILED DESCRIPTION

The present disclosure provides a drive assembly for connecting an engine crankshaft to a transmission in marine applications. The drive assembly includes a raw hub extension—with raw meaning that it is a forging that is machinable into a final component—configured for acting together and relatively with the torsional damper, so as to facilitate assembling the drive assembly and to couple a torsional damper of high torque in a small space. In one preferred embodiment, the raw hub extension is a forging in accordance with the standard DIN 10083. The drive assembly can be used in a boat drive train to damp vibrations while allowing relative rotation between the engine crankshaft and the transmission. More specifically, the raw hub extension is developed to subsequently machine according to the need for form, space and special conditions on weight and inertia. The raw hub extension may have be treated via surface treatments including shot peening or sandblast peening.

An inner diameter of the raw hub extension may be splined in a subsequent machining process according to desired specifications. The hub extension may includes holes for reduction in weight and inertia and to facilitate final assembly. The hub extension may include external holes to receive fasteners, e.g., rivets, to join the hub extension with the damper. The hub extension may include external holes for receiving spacer bolts of the damper.

Figure 1:
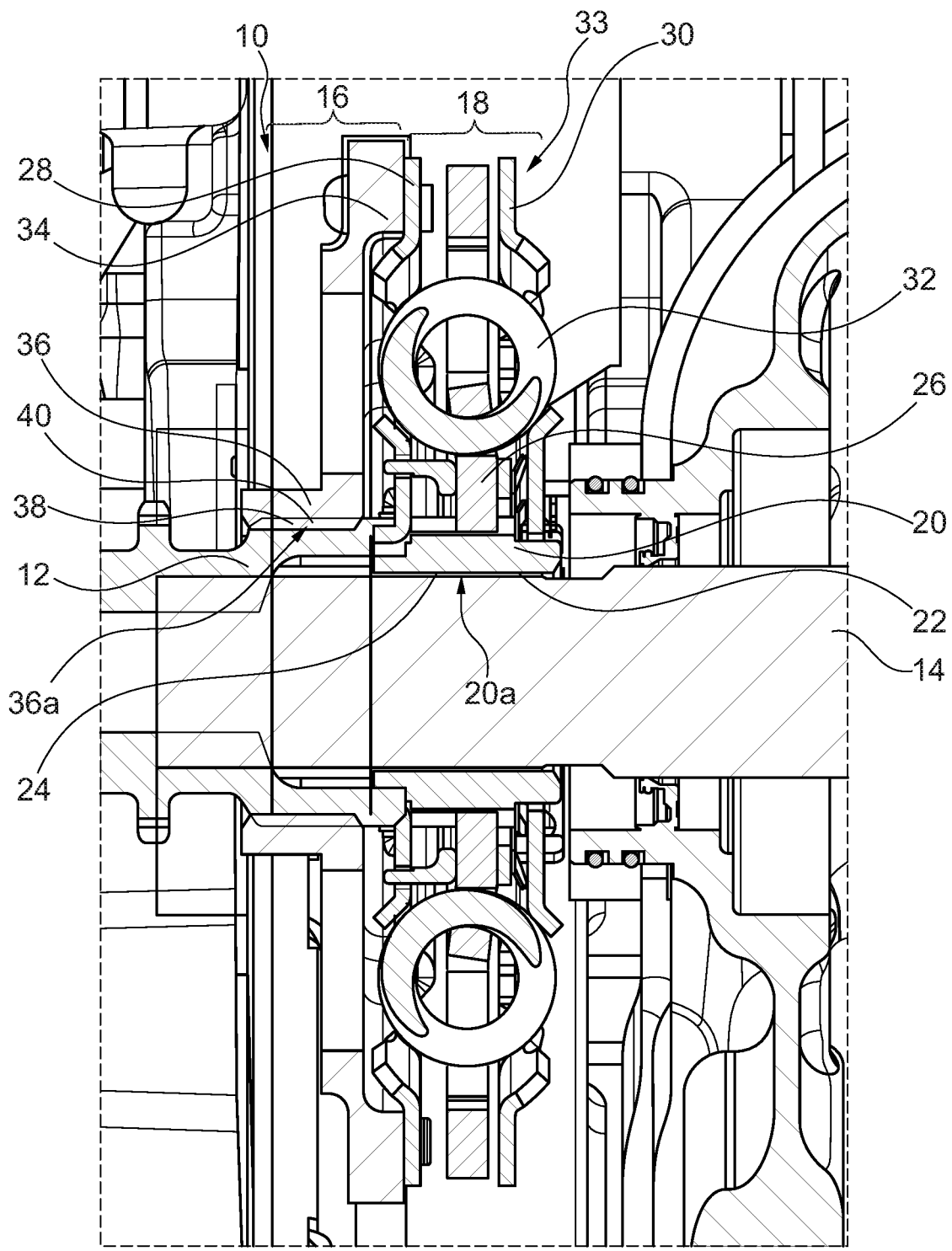
FIG. 1 shows a radial cross-sectional view of a drive assembly connecting an engine crankshaft to a transmission in accordance with an embodiment of the invention.

FIG. 1 shows a radial cross-sectional view of a drive assembly 10 connecting an engine crankshaft 12 to a transmission input shaft 14 in accordance with an embodiment of the invention. Drive assembly 10, crankshaft 12 and transmission input shaft 14 are configured for being arranged concentric to a center axis CA, about which drive assembly 10, crankshaft 12 and transmission input shaft 14 rotate during operation. Unless otherwise specified, the terms axial, radial and circumferential and derivations thereof are used with respect to center axis CA. Drive assembly includes a base assembly 16 configured for connecting to transmission input shaft 14 and a hub extension 18 configured for connecting to crankshaft 12.

Base assembly 16 includes an annular base hub 20 configured for non-rotatably connecting to transmission input shaft 14. More specifically, base hub 20 includes splines or teeth 22 on an inner circumferential surface 20a thereof configured for non-rotatably intermeshing with splines or teeth 24 on an outer circumferential surface of transmission input shaft 14. A base flange 26 is non-rotatably fixed to base hub 20 at an outer circumferential surface of base hub 20. Base assembly 16 further includes a front or engine side cover plate 28 and a rear or transmission side cover plate 30 that are drivingly connected to flange 26 by coil springs 32. Springs 32 circumferentially compress and expand during operation to allow relative rotation between flange 26 and cover plates 28, 30, which in turn allows relative rotation between crankshaft 12 and transmission input shaft 14. Base flange 26, cover plates 28, 30 and springs 32 together form a damper 33, with cover plates 28, 30 forming a torque input section of damper 33 and base flange 26 forming a torque output section of damper 33.

Raw hub extension 18 is formed as a single piece that includes a flange section 34 that is non-rotatably fixed to engine side cover plate 28 and an annular hub section 36 configured for being machined for non-rotatably connecting to crankshaft 12. More specifically, after machining, annular hub section 36 includes splines or teeth 38 on an inner circumferential surface 36a thereof configured for non-rotatably intermeshing with splines or teeth 40 on an outer circumferential surface of crankshaft 12. Annular hub section 36 includes a borehole having a greater diameter than a borehole of base hub 20 such that inner circumferential surface 36a of annular hub section 36 is greater than inner circumferential surface 20a of base hub 20.

Figure 2:
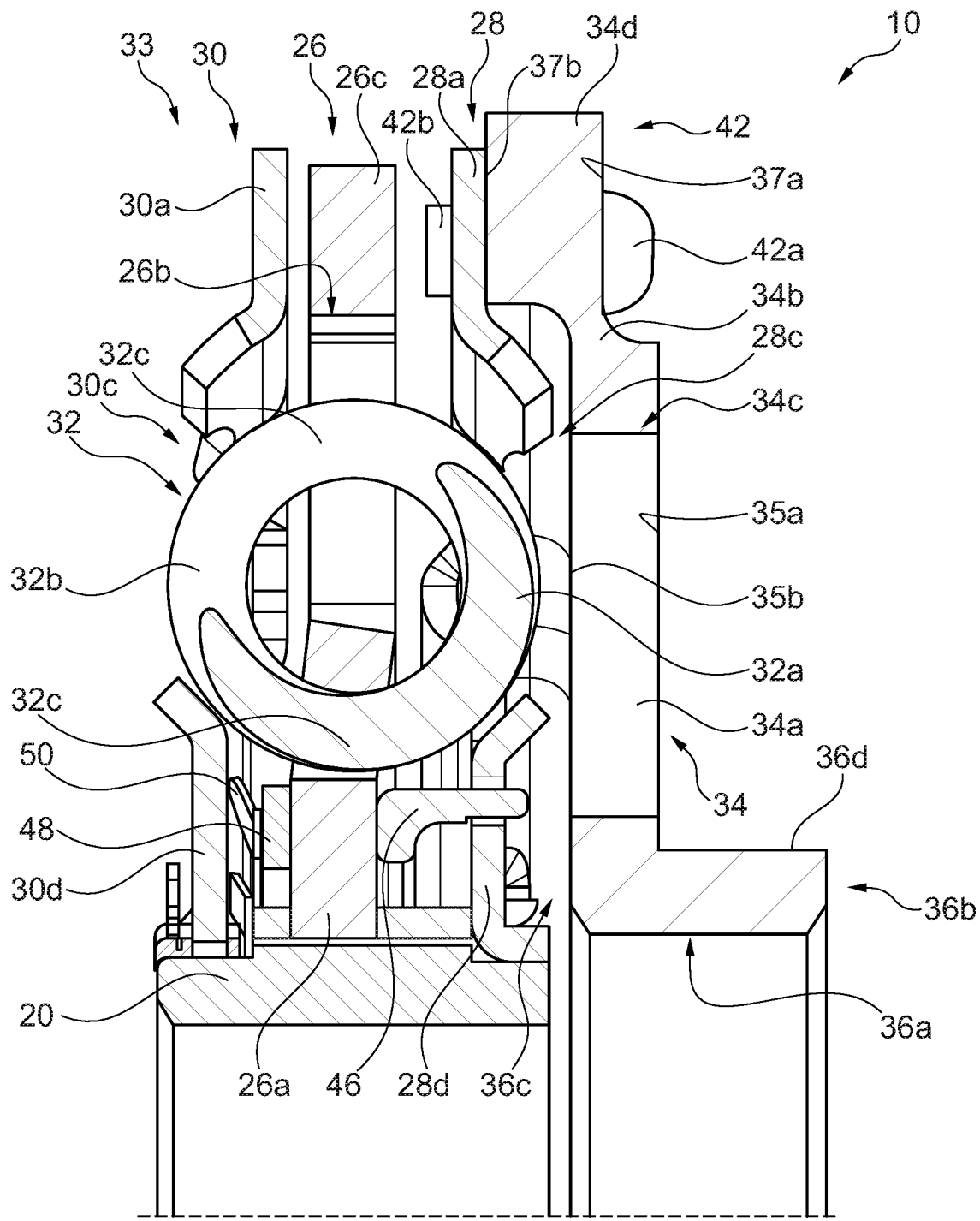
FIG. 2 shows an enlarged radial cross-sectional view of the drive assembly shown in FIG. 1.

FIG. 2 shows an enlarged view of drive assembly 10. Flange section 34 is formed as a single piece with annular hub section 36. Annular hub section 36 has a cylindrical shape and includes a first axial end 36b, which forms a free end of hub section 36, and a second axial end 36c that joins a radially inner portion 34a of flange section 34. Radially inner portion 34a of flange section 34 is aligned perpendicular to center axis CA and an outer circumferential surface 36d of hub section 36. Radially inner portion 34a has a constant thickness and includes an engine side surface 35a extending perpendicular to center axis CA and a transmission side surface 35b extending perpendicular to center axis CA. Radially inner portion 34a is provided with a plurality of circumferentially spaced guide holes 34c, which each have a circular shape, passing from surface 35a to surface 35b. Guide holes 34c each have a diameter D1 that is 35% to 60% of a radial length L1 of radially inner portion 34a. During the assembly process, carrier guides have pins that pass through guide holes 34c to align the components of drive assembly 10 in the correct position to aid in the assembly process. Radially outside of radially inner portion 34a, flange section 34 includes an intermediate portion 34b extending axially away from radially inner portion 34a and toward engine side cover plate 28 to join a radially outer portion 34c of flange section 34. Radially outer portion 34d is aligned perpendicular to center axis CA and, at a transmission side surface thereof, axially abuts a radially outer section 28a of engine side cover plate 28. Radially outer portion 34d has a constant thickness and includes an engine side surface 37a extending perpendicular to center axis CA and a transmission side surface 37b extending perpendicular to center axis CA. Radially outer portion 34d is thicker than radially inner portion 34a such that radially inner portion 34a has a thickness T1 that is 35% to 60% of a thickness T2 of radially outer portion. Radially outer portion 34d also has a radial length L2 that is 20% to 40% of the radial length L1 of radially inner portion 34a.

Figure 3:
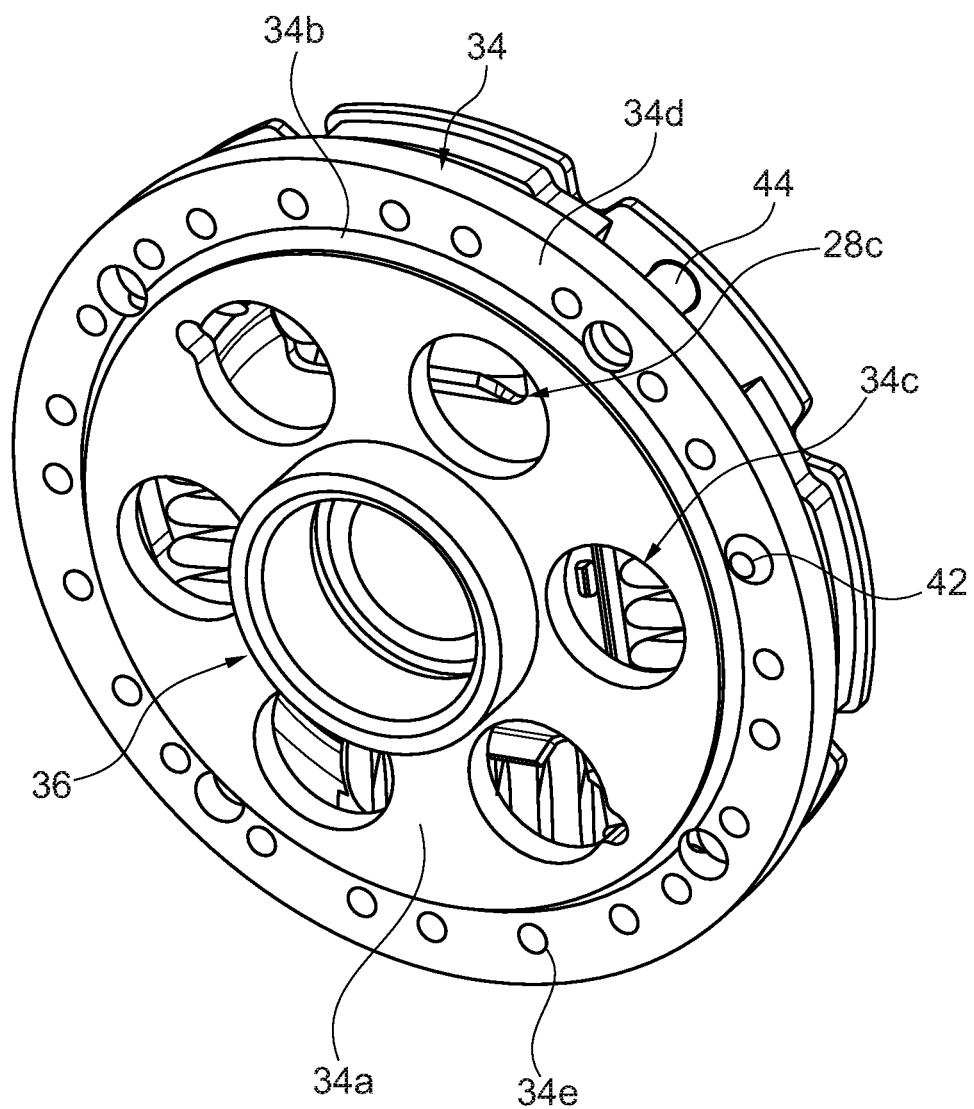
FIG. 3 shows an engine side perspective view of the drive assembly shown in FIG. 1.
Figure 5:
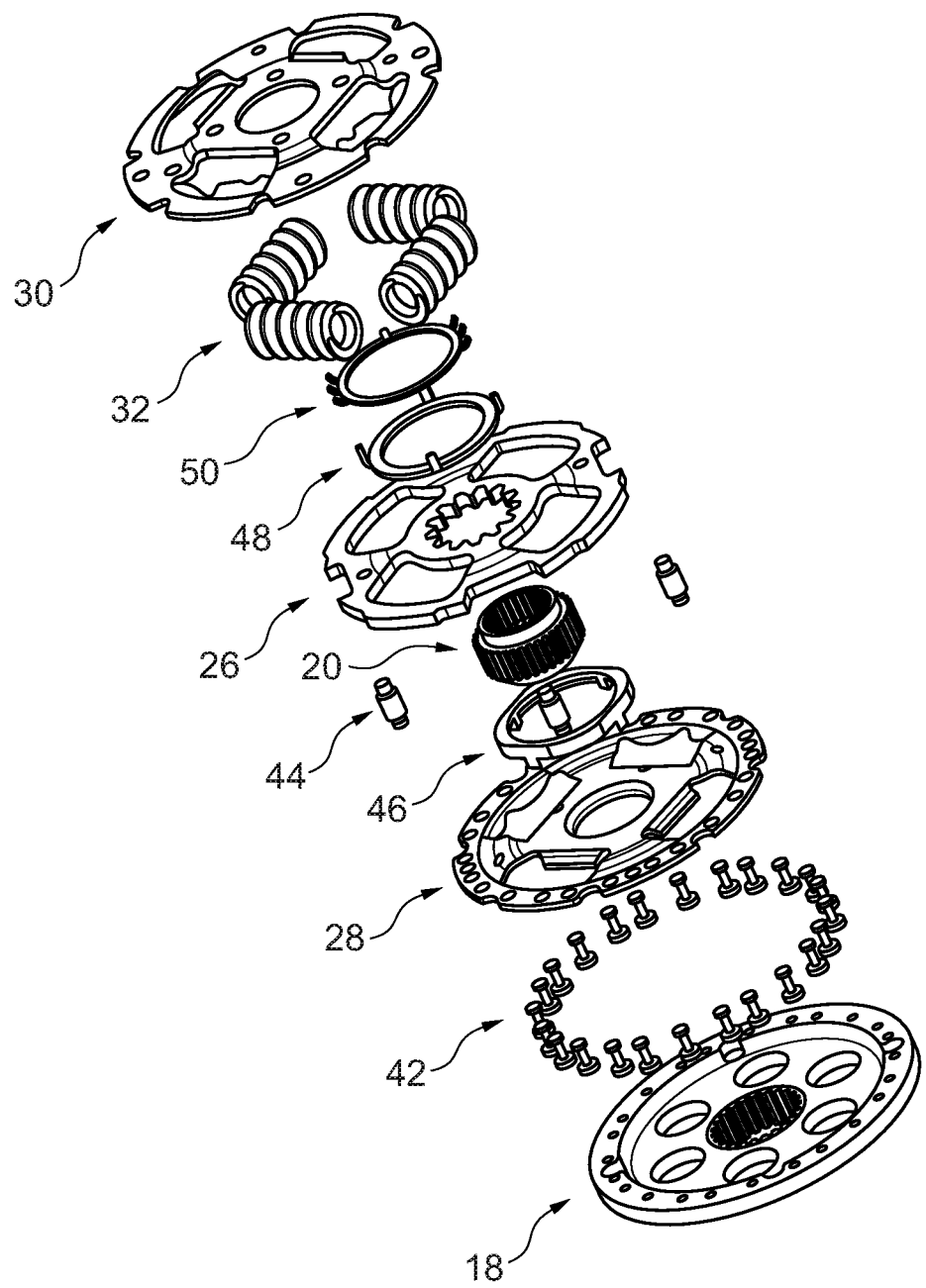
FIG. 5 shows an exploded view of the drive assembly shown in FIG. 1.

FIG. 3 shows an engine side perspective view of the drive assembly 10 shown in FIG. 1. FIG. 5 shows an exploded view of the drive assembly 10 shown in FIG. 1. Referring to FIGS. 2, 3 and 5 together, flange section 34 is fixed to engine side cover plate 28 via a plurality of circumferentially spaced fasteners 42. Fasteners 42 pass through holes 34e in radially outer portion 34d of flange section 34 and holes 28b in radially outer section 28a of engine side cover plate 28. Radially outer section 34d of extension flange 34 also includes holes 34f circumferentially offset from holes 34e that receive heads of spacer bolts 44, which are further described below. Holes 34f have a larger diameter than the heads of spacer bolts 44. Fasteners 42, which in one embodiment are rivets, each include a first head 42a for contacting an engine side surface of radially outer portion 34a of flange section 34 and a second head 42b for contacting an engine side surface of radially outer section 28a of engine side cover plate 28. Radially inside of radially outer section 28a, cover plate 28 includes a plurality circumferentially spaced windows 28c, with each of windows 28c receiving an engine side section 32a of one of springs 32. Radially inner portion 34a of flange section 34 extends radially outward past windows 28c such a radially outmost end of radially inner portion 34a is further radially outward than windows 28c and springs 32. Radially inside of windows 28c, cover plate 28 includes a radially inner section 28d rotatably positioned at the outer circumferential surface of base hub 20.

Figure 4:
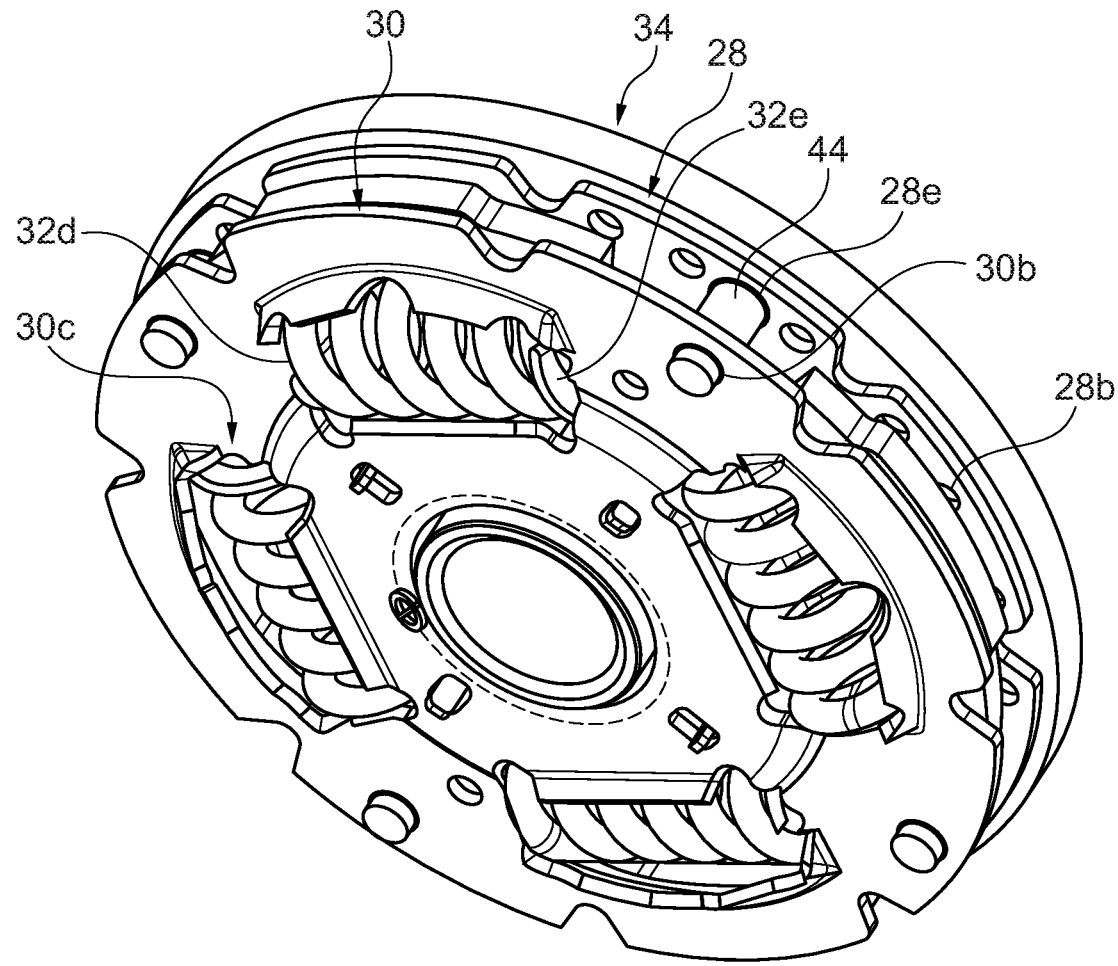
FIG. 4 shows a transmission side perspective view of the drive assembly shown in FIG. 1.

FIG. 4 shows a transmission side perspective view of the drive assembly shown in FIG. 1. Referring to FIGS. 2, 4 and 5, engine side cover plate 28 is fixed to transmission side cover plate 30 by a plurality of circumferentially spaced spacer bolts 44, which also axially space cover plates 28, 30 from each other by holding radially outer section 28a of cover plate 28 a fixed axial distance from a radially outer section 30a of cover plate 30. Spacer bolts 44 pass through holes 28e in radially outer section 28a of engine side cover plate 28 and holes 30b in radially outer section 30a of transmission side cover plate 30. Radially inside of radially outer section 30a, cover plate 30 includes a plurality circumferentially spaced windows 30c, with each of windows 30c receiving a transmission side section 32b of one of springs 32. Radially inside of windows 30c, cover plate 30 includes a radially inner section 30d rotatably positioned at the outer circumferential surface of base hub 20.

Base flange 26 is provided axially between cover plates 28, 30 and includes a radially inner section 26a permanently non-rotatably fixed directly to the outer circumferential surface of base hub 20. Radially outside of radially inner section 26a, base flange 26 includes a plurality circumferentially spaced windows 26b, with each of windows 26b receiving an axially center section 32c of one of springs 32. Radially outside of windows 26c, flange 26 includes a radially outer section 26c includes a plurality of circumferentially spaced cutouts 26d, which spacer bolts 44 extend axially through. Cutouts 26d allow spacer bolts 44 to move circumferentially with flange 26 during relative rotational movement of cover plates 28, 30 with respect to flange 26. Damper 33 is configured such that during relative rotation of base flange 26 with respect to cover plates 28, 30, circumferential edges of windows 28c, 30c can contact first circumferential ends 32d of springs while circumferential edges of windows 26b contact second circumferential ends 32e of springs 32 to compress springs 32.

Drive assembly 10 is configured to drivingly connect crankshaft 12 and transmission input shaft 14 together such that torque is input into drive assembly 10 via raw hub extension 18. Torque flows from crankshaft 12 through annular hub section 36 to flange section 34. Flange section 34 drives cover plates 28, 30 which then transfer torque through springs 32 to base flange 26, which drives base hub 20. Base hub 20 in turn transfers torque directly to transmission input shaft 14.

A method of assembling the drive assembly 10 may include the steps of fixing the cover plate 28 and hub extension 18 together via rivets 42, then adding plastic spacers 46 onto cover plate 28. Next, flange 26 is pressed against spacers 46, and hub 20 is inserted into flange 26 and cover plate 28. Coil springs 32 are then inserted into windows 26b and windows 28c, and a support washer 48 is pressed against flange 26. A diaphragm spring 50 is then pressed onto support washer 48, and first ends of spacer bolts 44 are inserted to holes in cover plate 28. Cover plate 30 is then pressed against diaphragm spring 50, such that holes in cover plate 30 receive second ends of spacer bolts 44. Next, the first and second ends of the spacer bolts 44 are riveted to fix cover plates 28, 30 together.

Due to the raw construction of hub extension 18, a large number of hub extensions 18 of the same size and shape may be manufactured for use with crankshafts that are different sizes and shapes. Accordingly, a method of the present disclosure may include manufacturing a plurality of the same hub extensions 18, and then machining a first subset of the hub extensions 18 in a first manner for non-rotatably connecting to a first crankshaft of a first size and a first shape, then machining a second subset of the hub extensions 18 in a second manner, which is different from the first manner, for non-rotatably connecting to a second crankshaft of a second size and a second shape, with at least one of the first size and the first shape being different from the second size and the second shape. More specifically, the machining is of the inner circumferential surface 36a of hub section 36 of hub extension. Accordingly, the inner circumferential surface 36a of the first subset of the hub extensions 18 is machined in the first manner to form hub sections 36 having a first borehole size and a first borehole shape that is configured for non-rotatably connecting different to the first crankshaft, then the inner circumferential surface 36a of the second subset of the hub extensions 18 is machined in the second manner to form hub sections 36 having a second borehole size and a second borehole shape that is configured for non-rotatably connecting different to the second crankshaft, with at least one of the first borehole size and the first borehole shape being different from the second borehole size and the second borehole shape. The boreholes shapes are for example defined by the splines or teeth formed in inner circumferential surface 36.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS 10 drive assembly
12 engine crankshaft
14 transmission input shaft
16 base assembly
18 raw hub extension
20 base hub
20a inner circumferential surface
22 splines or teeth
24 splines or teeth
26 base flange
26a radially inner section
26b windows
26c radially outer section
28 engine side cover plate
28a radially outer section
28b fastener holes 28c windows
28d radially inner section
28e spacer holes
30 transmission side cover plate
30a radially outer section
30b spacer holes
30c windows
30d radially inner section
32 springs
32a engine side section
32b transmission side section
32c axially center section
32d first circumferential ends
32e second circumferential ends
33 damper
34 flange section
34a radially inner section
34b intermediate section
34c guide holes
34d radially outer section
34e fastener holes
34f spacer bolt receiving holes
35a engine side surface
35b transmission side surface
36 hub section
36a inner circumferential surface
36b first axial end
36c second axial end
36d outer circumferential surface
37a engine side surface
37b transmission side surface
38 splines or teeth
40 splines or teeth
42 fasteners
42a first head
42b second head
44 spacer bolts
46 plastic spacers
48 support washer
50 diaphragm spring

What is claimed is:

1. A drive assembly for a vehicle drive train comprising:
a base assembly including a base hub configured for non-rotatably connecting to an outer circumferential surface of a transmission input shaft, the base assembly including a torsional damper, the torsional damper including an input section and an output section drivingly connected by springs, the springs allowing relative rotation between the input section and the output section, the output section of the torsional damper being non-rotatably fixed to the base hub; and
a hub extension configured for non-rotatably connecting to an engine crankshaft, the hub extension being non-rotatably fixed to the input section of the torsional damper at an engine side of the torsional damper, the torsional damper allowing relative rotation between the hub extension and the base hub,
the hub extension including a hub section configured for non-rotatably connecting to an outer circumferential surface of the engine crankshaft,
the hub extension including a flange section including a radially inner section joining an outer circumferential surface of the hub section,
the radially inner section being radially outward from the hub section.

2. The drive assembly as recited in claim 1 wherein the hub extension is a single piece.

3. The drive assembly as recited in claim 1 wherein the flange section is non-rotatably fixed to the input section of the torsional damper.

4. The drive assembly as recited in claim 3 wherein the flange section is non-rotatably fixed to the input section of the torsional damper by fasteners passing through a radially outer section of the flange section, the radially outer section of the flange section being radially outward from the radially inner section of the flange section.

5. The drive assembly as recited in claim 4 wherein the flange section includes an intermediate section radially between the radially inner section and the radially outer section, the intermediate section extending axially toward the torsional damper from the radially inner section to the radially outer section.

6. The drive assembly as recited in claim 5 wherein the input section includes an engine side cover plate and a transmission side cover plate each including windows for receiving the springs, the engine side cover plate including a radially outer section outside of the windows thereof, the fasteners passing through the radially outer section of the engine side cover plate.

7. The drive assembly as recited in claim 1 wherein an inner diameter of the hub section is greater than an inner diameter of the base hub.

8. A method of constructing a drive assembly for a vehicle drive train comprising:
constructing a base assembly including a base hub configured for non-rotatably connecting to an outer circumferential surface of a transmission input shaft, the base assembly including a torsional damper, the torsional damper including an input section and an output section drivingly connected by springs, the springs allowing relative rotation between the input section and the output section, the output section of the torsional damper being non-rotatably fixed to the base hub; and
non-rotatably fixing a hub extension to the input section of the torsional damper at an engine side of the torsional damper, the hub extension being configured for non-rotatably connecting to an engine crankshaft, the torsional damper allowing relative rotation between the hub extension and the base hub,
the hub extension including a hub section having an annular shape and including an inner circumferential surface defining an innermost circumferential surface of the hub extension, the inner circumferential surface configured for receiving and directly non-rotatably connecting to the outer circumferential surface of the engine crankshaft.

9. The method as recited in claim 8 further comprising forging a raw hub extension as a single piece including a flange section and the hub section, a radially inner section of the flange section joining an outer circumferential surface of the hub section.

10. The method as recited in claim 9 further comprising, after the forging of the raw hub extension as the single piece, forming the hub extension by machining an inner circumferential surface of the hub section into a configuration for non-rotatably connecting to an outer circumferential surface of the engine crankshaft.

11. The method as recited in claim 9 wherein the non-rotatably fixing of the hub extension to the input section of the torsional damper including non-rotatably fixing the flange section to the input section of the torsional damper.

12. The method as recited in claim 11 wherein the flange section is non-rotatably fixed to the input section of the torsional damper by fasteners passing through a radially outer section of the flange section, the radially outer section of the flange section being radially outward from the radially inner section of the flange section.

13. The method as recited in claim 12 wherein the flange section includes an intermediate section radially between the radially inner section and the radially outer section, the intermediate section extending axially toward the torsional damper to connect the radially inner section to the radially outer section.

14. The method as recited in claim 13 wherein the input part includes an engine side cover plate and a transmission side cover plate each including windows for receiving the springs, the engine side cover plate including a radially outer section outside of the windows thereof, the fasteners passing through the radially outer section of the engine side cover plate.

15. The method as recited in claim 14 wherein an inner diameter of the hub section is greater than an inner diameter of the base hub.

16. The drive assembly as recited in claim 1 wherein the hub extension includes the hub section having an annular shape and including an inner circumferential surface defining an innermost circumferential surface of the hub extension, the inner circumferential surface configured for receiving and directly non-rotatably connecting to the outer circumferential surface of the engine crankshaft.

17. The drive assembly as recited in claim 3 wherein the input section includes an engine side cover plate including windows for receiving the springs, the engine side cover plate including a radially outer section outside of the windows thereof, the flange section being non-rotatably fixed to the input section of the torsional damper by fasteners passing through the radially outer section of the engine side cover plate.

18. The method as recited in claim 8 wherein the hub extension includes the hub section configured for non-rotatably connecting to an outer circumferential surface of the engine crankshaft,
    the hub extension including a flange section including a radially inner section joining an outer circumferential surface of the hub section,
    the radially inner section being radially outward from the hub section.

19. The method as recited in claim 12 wherein the input part includes an engine side cover plate including windows for receiving the springs, the engine side cover plate including a radially outer section outside of the windows thereof, the flange section being non-rotatably fixed to the input section of the torsional damper by the fasteners passing through the radially outer section of the engine side cover plate.

* * * * *